Inventor
WALTER HOMAN

By Carl Benst.
His Attorney

Patented July 12, 1949

2,475,666

UNITED STATES PATENT OFFICE 2,475,666

HOMING MECHANISM FOR CASH REGISTERS AND ACCOUNTING MACHINES

Walter Homan, Dayton, Ohio, assignor to The National Cash Register Company, Dayton, Ohio, a corporation of Maryland Application August 29, 1947, Serial No. 771,322

10 Claims. (Cl. 318—470)

This invention relates to homing devices for cash registers and accounting machines.

Cash registers and accounting machines are usually constructed to be operated by an electric motor of the kind known in the art as "stop-start" motors, that is, a motor which is normally at rest and which is energized for each machine operation. In such machines it is necessary to open the circuit through the motor before the end of machine operation in order to give the machine arresting means time to function. From experiment it has been found that approximately 5 degrees of rotation of the main shaft provides sufficient time for this purpose. When the current is cut off through the motor the machine coasts home, due to the momentum of the moving parts of the machine. At times, particularly when the machine is new, or when the bearings therein become gummed up after long use, there is sufficient resistance to prevent the machine from coasting all the way home after the current has been cut off through the motor. When this occurs it is necessary to return the machine home manually before the machine can again be released for an operation.

The object of the present invention is to provide a means to positively move the machine to its home position after the current has been cut off through the motor, if the machine fails to do so.

A specific object of the invention is to provide a means operated by the armature of the motor to move the main shaft of the machine home after current through the motor has been cut off.

A specific object of the invention is to provide a means which utilizes the momentum of the armature of the motor after the current through the motor has been cut off to nudge the main shaft into home position.

With this and incidental objects in view, the invention includes certain novel features of construction and combinations of parts, the essential elements of which are set forth in appended claims and a preferred form or embodiment of which is hereinafter described with reference to the drawings which accompany and form a part of this specification.

General description

Figure 1:
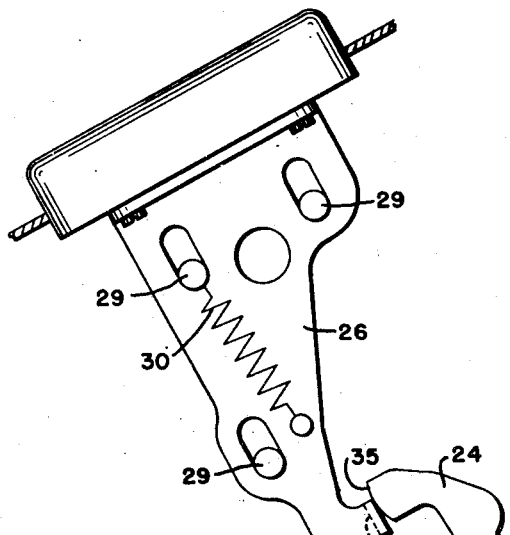
Fig. 1 is a side view of the motor starting controls, the machine release mechanism, the controls for cutting off the current through the motor, and the means for arresting machine in its home position.
Figure 1:
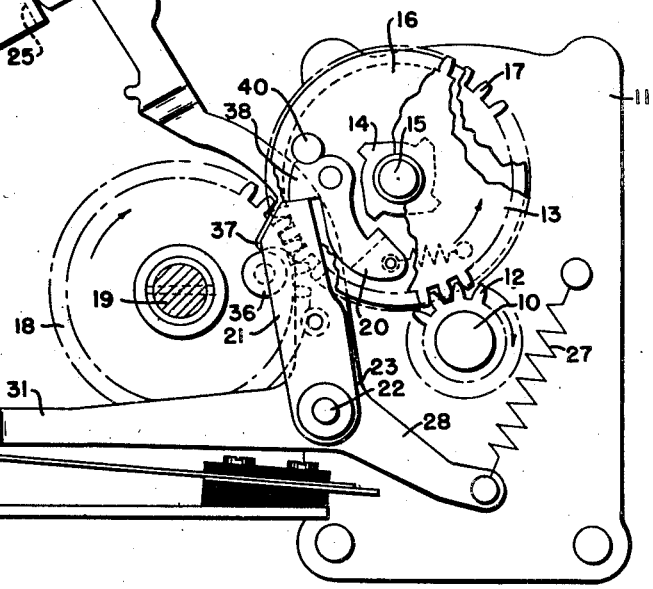

The invention is disclosed herein as being applied to a machine of the class shown and described in application for United States Letters Patent, Serial Number 430,214, filed on February 10, 1942, now Patent 2,443,652.

In machines of the type disclosed in said application a motor is usually provided for operating the machine through various cycles. Such machines are normally locked in their home positions and the motor is unclutched from the main shaft of the machine. A manipulative device is provided to release the machine for operation and at the same time clutch the motor to the main shaft, and to close the switch in the circuit through the motor. At the end of a machine operation the switch must be opened, the clutch must be released, and the manipulative device returned to its home position. The latter operations require some time at the end of the machine operation. From experiment it has been found that approximately five degrees of rotation of the main shaft are required to allow for the proper restoring operations of said controls. This results in the switch which controls the circuit through the motor opening before the machine is brought all the way home. Under normal conditions, the momentum of the moving parts of the machine is sufficient to carry the main shaft all the way home, where it is arrested by a positive stop. However, under extraordinary conditions this momentum is not sufficient and if the machine is not carried all the way home the machine cannot be released for a subsequent operation until restored home manually. To overcome this objection and to assure that the machine will always be brought home, advantage is taken of the momentum of the motor armature after the current is interrupted through the motor. A cam is mounted on the armature, which cam oscillates a pusher slide constantly while the armature rotates. The pusher slide is arranged to engage a member on the main shaft at the very end of the machine operation to nudge the main shaft home, even though the current is cut off through the motor.

In machines of the class illustrated herein, a positive stop is provided to arrest the main shaft in home position. In the prior art spring actuated homing devices were sometimes used to bring the main shaft home after the motor switch has been opened. Such devices require a powerful spring, which when released throws the stopping means against the positive stop with considerable force, with the result that the machine sometimes rebounds. To overcome this rebounding action, "anti-back-up" pawls must be used. The action of the homing device herein disclosed is so gentle that no rebound ever occurs, thus eliminating the necessity of "anti-back-up" pawls.

The gentle action of the homing device herein disclosed also results in the elimination of noises coincident with stopping action of the fast-moving spring-actuated parts suddenly encountering a positive stop, as disclosed in the prior art.

Another improvement in the herein disclosed homing device is that it is effective only when needed. In a free running machine, where the machine is restored to its home position without the need of a homing mechanism, the herein disclosed homing mechanism runs idly. However, in a spring actuated homing device, the spring is stretched and released during every machine operation, whether needed or not. This results in doing unnecessary work and producing unnecessary noises. These noises are accentuated on machines which operate free enough not to require a homing device because in free operating machines the machine is operated by the homing spring at a very high velocity and the resulting shock when suddenly stopped.

Detailed description

An armature 10 of a motor 11 has secured thereon a pinion 12 meshing with a gear 13 connected to a clutch member 14, loosely rotatable on a shaft 15. Also rotatable on the shaft 15 is a disk 16 secured to a gear 17 in mesh with a gear 18 secured to the main shaft 19 of the machine. Pivotally mounted on the disk 16 is a spring-actuated clutch pawl 20, which is normally held disengaged from the clutch member 14 by an arm 21, carried by a shaft 22 pivoted on the motor frame 11. Secured to the arm 21 so as to pivot therewith is a three-armed lever 23 having an upwardly extending arm 24 normally held in engagement with a toe 25 of a release key 26 by a spring 27 connected to an arm 28 of the three-armed lever 23. The release key 26 is mounted on a side frame of the machine by three studs 29, which studs also act as a limiting stop for the key 26 when a spring 30 returns the key 26 to its normal undepressed position. The three-armed lever 23 is provided with a forwardly extending switch operating arm 31 having an insulating block 32 adapted to engage a switch blade 33 to engage the latter with a switch contact 34, when the three-armed lever 23 is released to the action of its spring 27, thus closing a circuit through the motor to start the motor armature rotaing.

Depression of the key 26 shifts the toe 25 thereof below the finger 35 of the arm 24, thus permitting the spring 27 to rock the three-armed lever 23 and the arm 21 in a counter clockwise direction. Counter clockwise movement of the arm 21 releases the clutch pawl 20 to the action of its spring to permit the clutch pawl 20 to engage the clutch member 14. Since at this time the motor has been started by the switch arm 31, the motor starts to operate, thus rotating the armature 10 and through the gear 13 and clutch, consisting of the members 14 and 20, starts rotating the disk 16 and the gears 17 and 18 to rotate the main shaft 19 in a clockwise direction. Near the end of the complete rotation of the main shaft 19, a stud 36 on the gear 18 comes into engagement with a nose 37 on the arm 24 and thereby cams the arm 24 in a clockwise direction to move the arm 21 into the path of a tail 38 of the clutch pawl 20. At the same time the three-armed lever 23 permits the switch through the motor to open. As the tail 38 approaches the end of the arm 21 and contacts it, the clutch pawl 20 rocks clockwise to disengage it from the clutch member 14, thus unclutching the armature 10 from the main shaft 19. A stud 40 carried by the disk 16 acts as a backing for the tail 38 on the clutch pawl 20 to form a positive stop when the tail 38 engages the end of the stop arm 21.

Also mounted on the armature 10 is a cam 41 (Fig. 2) in the form of an eccentric. A pusher slide 42 is provided with a roller 43 always held in engagement with the cam 41 by a spring 44. The slide 42 is mounted to slide on a collar on the armature 10 and is guided by a roller 45 carried by a stud on the side frame of the machine. The slide 42 is provided with an enlarged opening 46, the lower wall of which is normally held in engagement with the roller 45 by the spring 44, but the opening is enlarged to an extent to permit rocking movement of the slide 42 around the armature for a purpose to be presently described.

Mounted on the main shaft 19 is a disk 47 having a surface 48 normally engaged by a finger 49 of the pusher slide 42.

Figure 2:
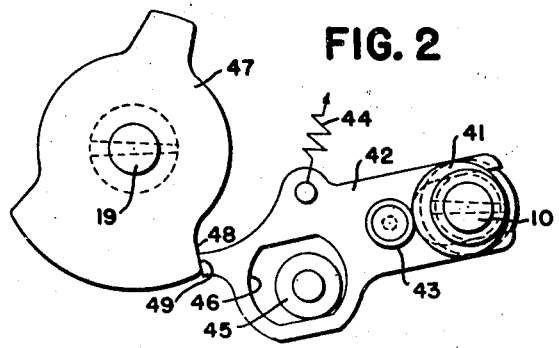
Fig. 2 is a side view of a means actuated by the motor armature to nudge the main shaft into its home position.

When the parts are in the position shown in Fig. 2 the machine is in its home position. At the beginning of the clockwise rotation of the shaft 19, upon release of the machine for operation, the disk 47 is rotated with the main shaft and therefore the surface 48 is moved away from the toe 49. As the outer diameter of the disk 47 approaches the slide 42 it will rock the slide downwardly against the action of the spring 44 while the cam 41 is oscillating the slide 42 back and forth. Near the very end of the operation of the main shaft 19 when the slide 42 is moved to the right, (Fig. 2), by the cam 41, the spring 44 snaps the slide 42 upwardly in a clockwise direction to move the toe 46 into the path of the surface 48 and upon further rotation of the cam 41 the slide 42 nudges the disk 47 and therefore the main shaft 19 into its home position.

The nudging operation of the slide 42 takes place after the current has been cut off through the motor. However, at this time the armature 10 is still rotating at a very rapid pace and the momentum is sufficient to operate the slide 42 and engage and move the disk 47 into its home position. From the above it can be seen that the main shaft of the machine is always brought home by the slide 42 even though the main shaft is unclutched from the armature shaft and the current is cut off through the motor before the main shaft reaches its home position. It can also be seen that the slide 42 is operated by a cam on the motor shaft, which cam is operating at a speed sufficient to carry the slide 42 into engagement with the disk 47 to restore the main cam shaft to its home position by power furnished by the momentum of the armature shaft of the motor.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, in combination with a driven member having a home position, an electric motor, connections from the motor to the driven member to operate the driven member through a cycle of operation, said connections including a clutch normally ineffective, an electric switch normally open, a manipulative device operable to render the clutch effective and to close the switch to complete an electrical circuit through the motor to start the motor, operating means on the driven member to open said switch prior to a complete operation thereof to interrupt the electrical circuit through said motor, and means to arrest the operation of the driven member in said home position when a cycle of operation thereof has been completed; of a cam driven by said motor, an oscillating means actuated by said cam, and means on the driven member coming into the path of movement of the oscillating means when the driven member nears the completion of a cycle of operation and after said switch has been opened so that the oscillating means may move the driven member into said home position by the power of momentum of the motor armature after the circuit though the motor has been interrupted.

2. In a machine of the class described, in combination with a driven member having a home position, an electric motor, connections from the motor to the driven member to operate the driven member through one cycle of operation, said connections including a clutch normally ineffective, an electric switch normally open, a manipulative device operable to render the clutch effective and to close the switch to complete an electrical circuit through the motor to start the motor operating, means on the driven member to open said switch prior to a complete cycle of operation thereof to interrupt the electrical circuit through said motor, and means to arrest the operation of the driven member in said home position when a cycle of operation thereof has been completed; of a cam driven by the motor, an oscillating means actuated by said cam, and means on the driven member coming into the path of movement of the oscillating means after said switch has been opened, said oscillating means acting to restore the driven member to its home position by power derived from momentum of the motor.

3. In a machine of the class described, in combination with a driven member having a home position, an electric motor, connections from the motor to the driven member to operate the driven member through one cycle of operation, said connections including a clutch normally ineffective, an electric switch normally open, a manipulative device operable to render the clutch effective and to close the switch to complete an electrical circuit through the motor to start the motor operating, means on the driven member to open said switch prior to a complete cycle of operation thereof to interrupt the electrical circuit through said motor, and means to arrest the operation of the driven member in said home position when a cycle of operation has been completed; of a cam driven by said motor, an oscillating means actuated by said cam, and means on the driven member coming into the path of movement of the oscillating means only after the said switch has been opened and the electrical connections have been interrupted through the motor but before the armature comes to rest after expending its momentum to restore the main shaft to its home position.

4. In a machine of the class described, in combination with a driven member having a home position, an electric motor, connections from the motor to the driven member to operate the driven member through one cycle of operation, said connections including a clutch normally ineffective, an electric switch normally open, a manipulative device operable to render the clutch effective and to close the switch to complete an electrical circuit through the motor to start the motor operating, means on the driven member to open said switch prior to a complete cycle of operation of the driven member to interrupt the electric circuit through said motor, said motor operating by momentum after the switch has been opened; of a cam driven by said motor, an oscillating means actuated by said cam, and means on the driven member coming into the path of movement of the oscillating means after the circuit has been opened through the motor and while the armature of said motor and said cam are operating by momentum, whereby the driven member is moved into its home position.

5. In a machine of the class described, in combination with a driven member having a home position, an electric motor to operate the driven member, a clutch to connect the motor to the driven member, an electric switch normally open, a manipulative device operable to close the switch to complete an electric circuit through the motor to start the motor operating and to render the clutch effective, means on the driven member to open said switch prior to a complete cycle of operation of the driven member to interrupt the electrical circuit through said motor, said motor operating by the force of momentum after the circuit has been opened there-through, and means to disable the clutch near the end of the operation of the drive member, of a cam driven by said motor, by the force of said momentum after the circuit has been opened and the clutch has been disabled, an oscillating means actuated by said cam, and means on the driven member coming into the path of movement of the oscillating means near the end of the operation of the driven member whereby the oscillating member nudges the driven member into its home position.

6. In a machine of the class described, a main shaft having a home position and operable through one complete rotation for a machine operation, a motor for rotating the main shaft, a manipulative device, a switch closed upon operating the manipulative device to close a circuit through the motor, means on the main shaft to open the switch to interrupt the circuit through the motor prior to the complete rotation thereof, in combination with a cam connected to the motor armature, a slide adapted to be oscillated by said cam, an enlarged opening in the slide to allow rocking movement of the slide as the slide is oscillating, a means on the main shaft adapted to engage the slide near the end of the rotation of the main shaft to rock the slide, a surface on said means on the shaft coming into the path of movement of said slide, a spring on the slide to rock the slide into the path of movement of said means on the shaft, said cam acting through said slide and by the force of momentum to move said means on the shaft to its home position after the circuit through the motor has been interrupted.

7. In a machine of the class described, a main operating shaft, a motor adapted to be energized to rotate the shaft substantially one rotation, a normally disabled clutch to connect the motor to the shaft, means to energize the motor and to simultaneously enable the clutch, means to deenergize the motor and to disable the clutch after said substantial rotation of the shaft, and means actuated by said motor to complete the rotation of the shaft by utilizing the momentum of the motor after the motor has become deenergized and the clutch has been disabled.

8. In a machine of the class described, a main shaft, a motor adapted to rotate the main shaft substantially a complete rotation, a normally disabled clutch to connect the motor to the shaft, means to energize the motor and to simultaneously enable the clutch, means to deenergize the motor and to disable the clutch after said substantial rotation of the shaft, a cam rotated by the motor after the motor has become deenergized, and means between the main shaft and the cam and actuated by the latter to complete the rotation of said main shaft after the motor has become deenergized and the clutch has been disabled.

9. In a machine of the class described, a main shaft, a motor to rotate the shaft less than a complete rotation while energized, a normally disabled clutch to connect the motor to the shaft, means to energize the motor and to simultaneously enable the clutch, means to deenergize the motor and to disable the clutch upon the completion of said less than a complete rotation of the shaft, a cam on the motor armature adapted to rotate after the motor has become deenergized, a slide coacting with said cam, and means on the main shaft actuated by said slide after the motor has become denergized and the clutch has been disabled to complete the rotation of the shaft.

10. In a machine of the class described, a main operating shaft, a motor to actuate the main shaft, a normally disabled clutch to connect the motor to the shaft, means to close a circuit through said motor to rotate the main shaft less than a complete rotation, means to open the circuit through the said motor and to disable the clutch on completion of said less than a complete rotation, said motor operable by momentum after the motor has been deenergized, means on said main shaft, a slide, and a cam operated by the motor to oscillate the slide, said slide adapted to engage the means on the main shaft after circuit through the motor has been opened and the clutch has been disabled to move the main shaft to its home position to thereby complete the rotation thereof.

WALTER HOMAN.

REFERENCES CITED

The following references are of record in the file of this patent:

UNITED STATES PATENTS

| Number | Name | Date |
|---|---|---|
| 841,335 | McBerty | Jan. 15, 1907 |
| 910,690 | Kettering | Jan. 26, 1909 |

Certificate of Correction

Patent No. 2,475,666.                                                July 12, 1949.

WALTER HOMAN

It is hereby certified that errors appear in the printed specification of the above numbered patent requiring correction as follows:

Column 3, line 57, for "rotaing" read *rotating*; column 6, line 38, claim 5, for the word "drive" read *driven*;

and that the said Letters Patent should be read with these corrections therein that the same may conform to the record of the case in the Patent Office.

Signed and sealed this 29th day of November, A. D. 1949.

[SEAL]

THOMAS F. MURPHY,
*Assistant Commissioner of Patents.*